US010394852B2

(12) United States Patent
Bremer et al.

(10) Patent No.: US 10,394,852 B2
(45) Date of Patent: *Aug. 27, 2019

(54) CUSTODIAN DISAMBIGUATION AND DATA MATCHING

(71) Applicant: International Business Machines Corporation, Armonk, NY (US)

(72) Inventors: Lars Bremer, Boeblingen (DE); Thomas A. P. Hampp-Bahnmueller, Stuttgart (DE); Markus Lorch, Dettenhausen (DE); Pavlo Petrenko, Boeblingen (DE); Sebastian B. Schmid, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 460 days.

This patent is subject to a terminal disclaimer.

(21) Appl. No.: 15/068,129

(22) Filed: Mar. 11, 2016

(65) Prior Publication Data

US 2016/0314186 A1 Oct. 27, 2016

Related U.S. Application Data

(63) Continuation of application No. 14/692,543, filed on Apr. 21, 2015.

(51) Int. Cl.
*G06F 16/00* (2019.01)
*G06F 7/02* (2006.01)
(Continued)

(52) U.S. Cl.
CPC ............ *G06F 16/285* (2019.01); *G06F 16/22* (2019.01); *G06F 16/2228* (2019.01); *G06F 16/258* (2019.01)

(58) Field of Classification Search
CPC ......... G06F 17/30739; G06F 17/30755; G06F 17/30495; G06F 17/30684;
(Continued)

(56) References Cited

U.S. PATENT DOCUMENTS 5,983,180 A * 11/1999 Robinson .............. G10L 15/142
704/254
8,442,812 B2 * 5/2013 Ehsani ................ G06F 17/2775
704/231

(Continued)

OTHER PUBLICATIONS

P. Christen et al., "Data Matching: Concepts and Techniques for Record Linkage, Entity Resolution, and Duplicate Detection", in Data-Centric Systems and Applications, copyright 2012, Total 279 pages.

(Continued)

*Primary Examiner* — Daniel A Kuddus
(74) *Attorney, Agent, or Firm* — Janaki K. Davda; Konrad, Raynes, Davda and Victor LLP

(57) ABSTRACT

Provided is a technique for matching different user representations of a person in a plurality of computer systems may be provided. The technique includes collecting information sets about user representations from a plurality of computer systems; normalizing the information sets to a unified format; grouping the information sets in the unified format into indexing buckets based on a user name using a non-phonetic algorithm; determining a similarity score for each pair of information sets in each of the indexing buckets; classifying each information set pair into a set of classes based on the similarity scores, wherein the set of classes comprise at least matches and non-matches; and using a data structure for merging information of information set pairs classified as matches.

7 Claims, 7 Drawing Sheets

(51) Int. Cl.
*G06F 16/28* (2019.01)
*G06F 16/22* (2019.01)
*G06F 16/25* (2019.01)

(58) Field of Classification Search
CPC ......... G06F 17/30675; G06F 17/30657; G06F 17/30746; G06F 16/3331; G06F 16/355; G06F 16/285; G06F 16/3325; G06F 16/22; G06F 16/258; G06F 16/2228
See application file for complete search history.

(56) References Cited

U.S. PATENT DOCUMENTS

| | | | | |
|---|---|---|---|---|
| 8,574,871 | B2* | 11/2013 | Javaud | C07K 14/505 435/254.21 |
| 8,630,846 | B2* | 1/2014 | Ehsani | G06F 17/2775 704/231 |
| 8,635,207 | B2 | 1/2014 | Marlin | |
| 8,806,358 | B2 | 8/2014 | Mayer et al. | |
| 8,832,126 | B2 | 9/2014 | Kumar et al. | |
| 9,208,179 | B1* | 12/2015 | Song | G06F 16/20 |
| 9,251,138 | B2* | 2/2016 | Ehsani | G10L 15/193 |
| 2002/0128821 | A1* | 9/2002 | Ehsani | G10L 15/193 704/10 |
| 2008/0040308 | A1 | 2/2008 | Ranganathan et al. | |
| 2008/0243526 | A1 | 10/2008 | Nance et al. | |
| 2009/0021555 | A1* | 1/2009 | Morgan | B41J 2/16523 347/33 |
| 2009/0024555 | A1* | 1/2009 | Rieck | G06F 7/02 706/54 |
| 2009/0252039 | A1* | 10/2009 | Valdez | H04M 7/0057 370/238 |
| 2010/0125594 | A1* | 5/2010 | Li | G06F 16/90344 707/758 |
| 2010/0250455 | A1 | 9/2010 | Richards et al. | |
| 2012/0117076 | A1 | 5/2012 | Austermann | |
| 2012/0173506 | A1 | 7/2012 | Wilansky et al. | |
| 2013/0173255 | A1* | 7/2013 | Ehsani | G10L 15/193 704/9 |
| 2014/0278663 | A1 | 9/2014 | Samuel et al. | |
| 2016/0104481 | A1* | 4/2016 | Ehsani | G10L 15/193 704/9 |
| 2016/0147758 | A1 | 5/2016 | Chhaya et al. | |

OTHER PUBLICATIONS

"Code Project", (online) retrieved from the Internet on Apr. 17, 2015 at URL>http://www.codeproject.com, Total 3 pages.
D. Oard et al., "Information Retrieval for E-Discovery", dated May 16, 2013, Foundations and Trends(R) in Information Retrieval, vol. 7, No. 1 (2013), Total 148 pages.
Grace Period Disclosure—P. Petrenko, "Matching Heterogeneous Person Representations in the Context of Data Governance and Information Integration", Confidential submission to University on Mar. 25, 2014, and Public Disclosure Apr. 23, 2015, Total 112 pages.
"Defense of the Master Thesis of Palvo Petrenko" (online) retrieved from the Internet on Apr. 23, 2014, at URl >http:www.facebook. com/events/656173261130208, providing Public Disclosure date of Apr. 23, 2014,Total 2 pages.
P. Petrenko "Distributed and Self-organizing Systems", dated Apr. 2014, (online) retrieved from the Internet on Feb. 25, 2015, at URL>https://vsr.informatik.tu-chemnitz.de/edu/studentprojects/2013/ 021 . . . ,Total 2 pages.
A. Berson et al., "Similarity Libraries and Fuzzy Logic for Attribute Comparisons", in Master Data Management and Data Governance, copyright 2011, Second Edition, Total 22 pages.
G. Hohpe et al., "A Loosely Coupled Integration Solution" in "Enterprise Integration Patterns: Designing, Building, and Deploying Messaging Solutions", copyright 2004, The Addison Wesley Signature Series, Total 19 pages.
US Patent Application, dated Apr. 21, 2015, for U.S. Appl. No. 14/692,543 (54.133), filed Apr. 21, 2015, invented by Lars Bremer et al., Total 38 pages.
Preliminary Amendment, dated Apr. 21, 2015, U.S. Appl. No. 14/692,543 (54.133), filed Apr. 21, 2015, invented by Lars Bremer et al., Total 10 pages.
Preliminary Amendment, dated Mar. 11, 2016, U.S. Appl. No. 14/692,543 (54.133), filed Apr. 21, 2015, invented by Lars Bremer et al., Total 6 pages.
List of Patents or Patent Applications Treated as Related, dated Mar. 11, 2016, Total 2 pages.
Office Action, dated Jul. 26, 2017, U.S. Appl. No. 14/692,543 (54.133), filed Apr. 21, 2015, invented by Lars Bremer et al., Total 27 pages.
Response to Office Action, dated Oct. 26, 2017, U.S. Appl. No. 14/692,543 (54.133), filed Apr. 21, 2015, invented by Lars Bremer et al., Total 16 pages.
Final Office Action, dated Jan. 19, 2018, U.S. Appl. No. 14/692,543 (54.133), filed Apr. 21, 2015, invented by Lars Bremer et al., Total 19 pages.
Response to Final Office Action, dated May 17, 2018, U.S. Appl. No. 14/692,543 (54.133), filed Apr. 21, 2015, invented by Lars Bremer et al., Total 19 pages.
G. Kondrak, "N-Gram Similarity and Distance", dated 2005, Department of Computing Science, University of Alberta, Total 12 pages.
D. Sanchez, "Semantic Similarity Estimation in the Biomedical Domain: An Ontology-Based Information-Theoretic Perspective", dated Apr. 2011, Journal of Biomedical Informatics, Total 11 pages.
W. Goma et al., "A Survey of Text Similarity Approaches", dated Apr. 2013, International Journal of Computer Applications (0975-8887), vol. 68—No. 13, Total 6 pages.
Office Action, dated Sep. 11, 2018, U.S. Appl. No. 14/692,543 (54.133), filed Apr. 21, 2015, Total 26 pages.
Response to Office Action, dated Dec. 11, 2018, U.S. Appl. No. 14/692,543 (54.133), filed Apr. 21, 2015, Total 17 pages.
Final Office Action, dated Mar. 14, 2019, U.S. Appl. No. 14/692,543, filed Apr. 21, 2015, invented by Lars Bremer et al., Total 23 pages.

* cited by examiner

400

```
<rdf:RDF>
  <rdf:Description rdf:about="http://ibm.com/Mr. Killian Brady">
  <j.0:surname>Mr. Killian Brady</j.0:surname>
  <owl:sameAs>
        <rdf:Description rdf:about="http://ibm.com/Brady, Ki1lian">
          <j.0:surname>Brady, Killian</j.0:surname>
        </rdf:Description>
  </owl:sameAs>
</rdf:Description>
<rdf:Description rdf:about="http://ibm.com/Mr. Anthony Brophy">
  <j.0:surname>Mr. Anthony Brophy</j.0:surname>
  <owl:sameAs>
        <rdf:Description rdf:about="http://ibm.com/Brophy, Anthony"
              <j.0:surname>Brophy, Anthony</j.0:surname>
        </rdf:Description>
  </owl:sameAs>
</rdf:Description>
```

CUSTODIAN DISAMBIGUATION AND DATA MATCHING

BACKGROUND

Embodiments of the invention relate generally to matching different user representations of a person, and, specifically, to matching different user representations of a person in a plurality of computer systems.

Typically, legal custodians are represented in computer systems using system account Identifiers (IDs) and other identifiers that vary. For example, John Doe might be known by a human resource system with personnel ID 12345, whereas on department file servers, his ID may be "jdoe", and, in the email system, he may be known as john.doe@example.com, and so forth. If a custodian, for example, owns or has access to data that is responsive to a legal case, then this data may have to be put on legal hold. It may be crucial to identify all data that a particular custodian owns or had/has access to, irrespective of the computer system or application system this data is stored in, or by which identifier or alias the custodian is known on a specific system.

This is further complicated as custodians may have changed their work location, organizational unit, name or user ID and so on in the past. A single custodian may have many IDs for the various systems the custodian works with or is managed through, sometimes even multiple IDs for the same system may exist. Further complications are operational IDs that a custodian may have access to. Additional complication may exist through custodians with the same name, but differences in other attributes, such as an organizational unit or a previous name (e.g., maiden name).

Organizations may be faced with the question of whether a certain person or custodian may have accessed data via a computer system or application without having the opportunity to ask the person or to find out the truth.

SUMMARY

According to one aspect of the present invention, a computer-implemented method for matching different user representations of a person in a plurality of computer systems may be provided. The method may comprise collecting information sets about user representations from a plurality of computer systems; normalizing the information sets to a unified format; grouping the information sets in the unified format into indexing buckets based on a user name using a non-phonetic algorithm; determining a similarity score for each pair of information sets in each of the indexing buckets; classifying each information set pair into a set of classes based on the similarity scores, wherein the set of classes comprise at least matches and non-matches; and using a data structure for merging information of information set pairs classified as matches.

Additionally and according to another aspect, a system for matching different user representations of a person in a plurality of computer systems may be provided. The system may comprise a processor and storage coupled to the processor, wherein the storage stores program instructions, and wherein the program instructions, when executed by the processor perform: collecting information sets about user representations from a plurality of computer systems; normalizing the information sets to a unified format; grouping the information sets in the unified format into indexing buckets based on a user name using a non-phonetic algorithm; determining a similarity score for each pair of information sets in each of the indexing buckets; classifying each information set pair into a set of classes based on the similarity scores, wherein the set of classes comprise at least matches and non-matches; and using a data structure for merging information of information set pairs classified as matches.

Furthermore, embodiments may take the form of a computer program product for matching different representations of a person in a plurality of computer systems. The computer program product may comprise a computer readable storage medium having program instructions embodied therewith, the program instructions being executable by at least one processor of a computer to cause the computer to perform: collecting information sets about user representations from a plurality of computer systems; normalizing the information sets to a unified format; grouping the information sets in the unified format into indexing buckets based on a user name using a non-phonetic algorithm; determining a similarity score for each pair of information sets in each of the indexing buckets; classifying each information set pair into a set of classes based on the similarity scores, wherein the set of classes comprise at least matches and non-matches; and using a data structure for merging information of information set pairs classified as matches.

BRIEF DESCRIPTION OF THE SEVERAL VIEWS OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Figure 1:
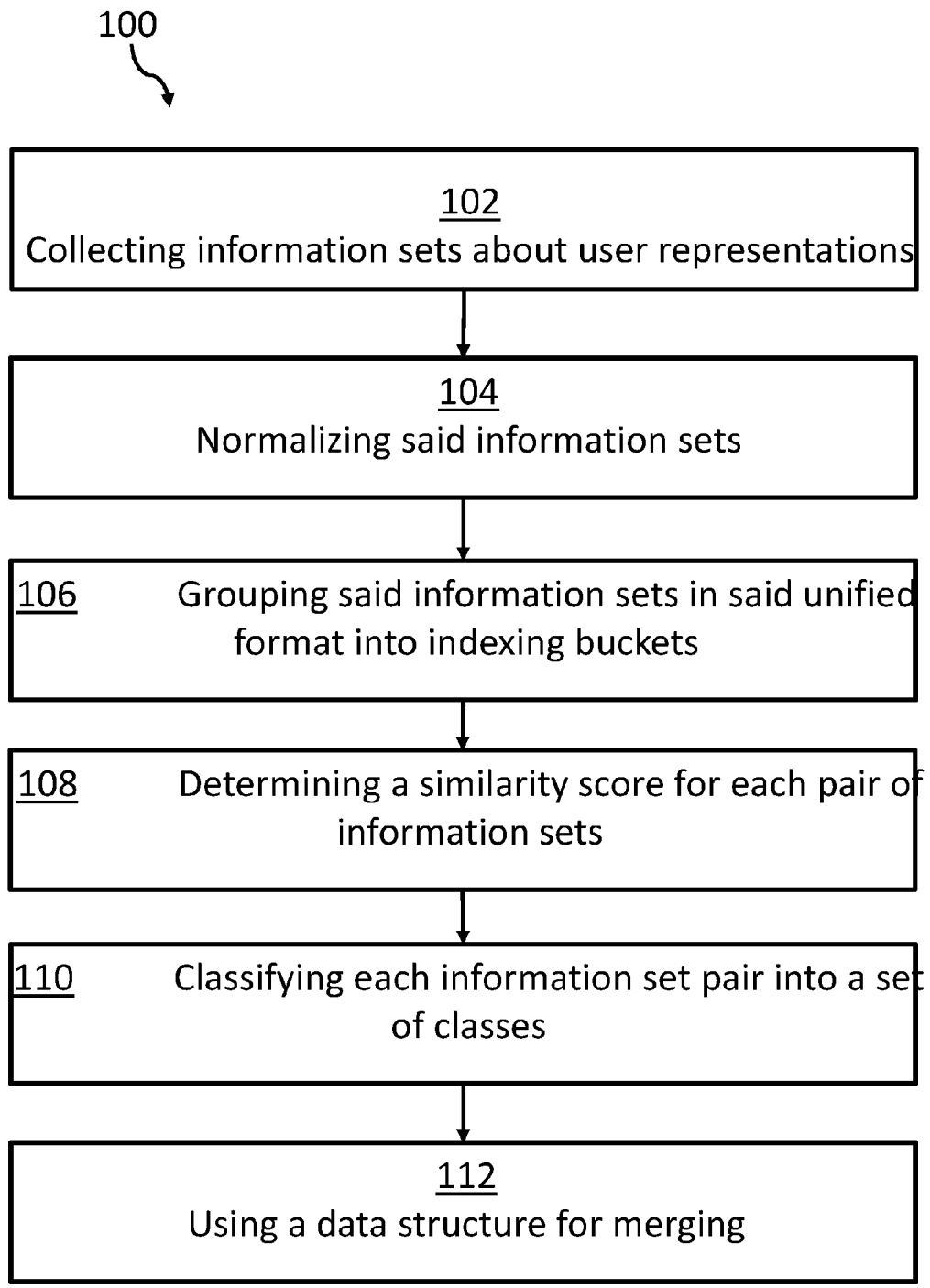

Embodiments of the invention will be described, by way of example only, and with reference to the following drawings:

FIG. 1 shows a block diagram of operations for matching different user representations of a person in accordance with certain embodiments.

Figure 2:
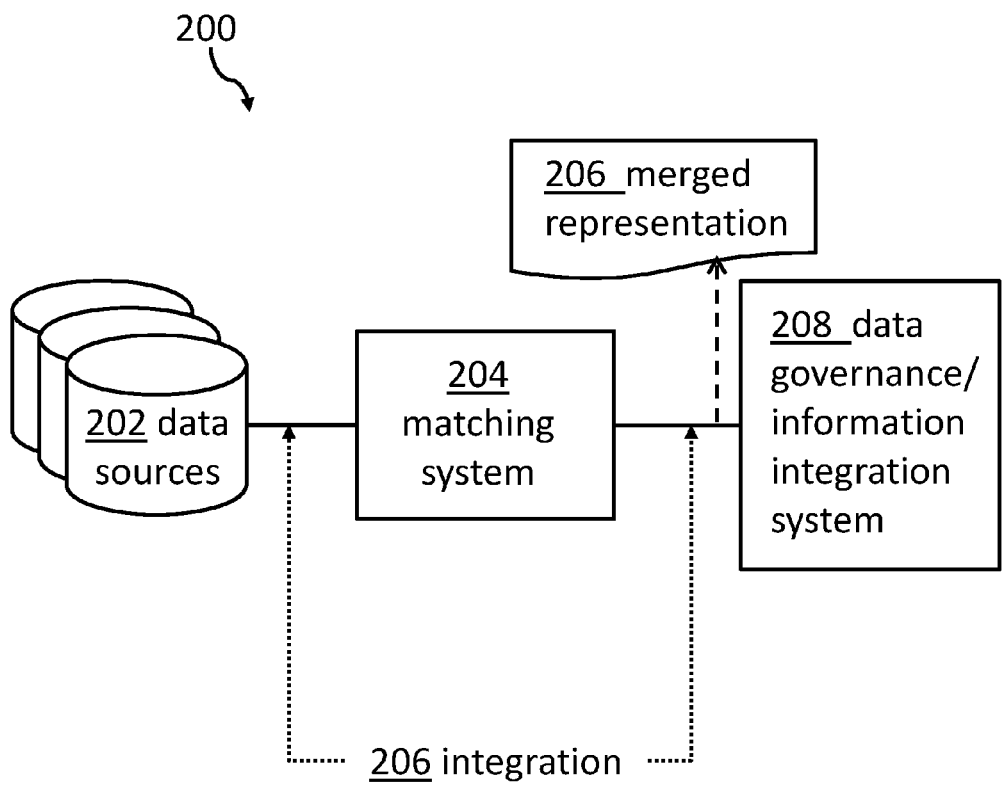

FIG. 2 shows a block diagram of main components of a related system in accordance with certain embodiments.

Figure 3A:
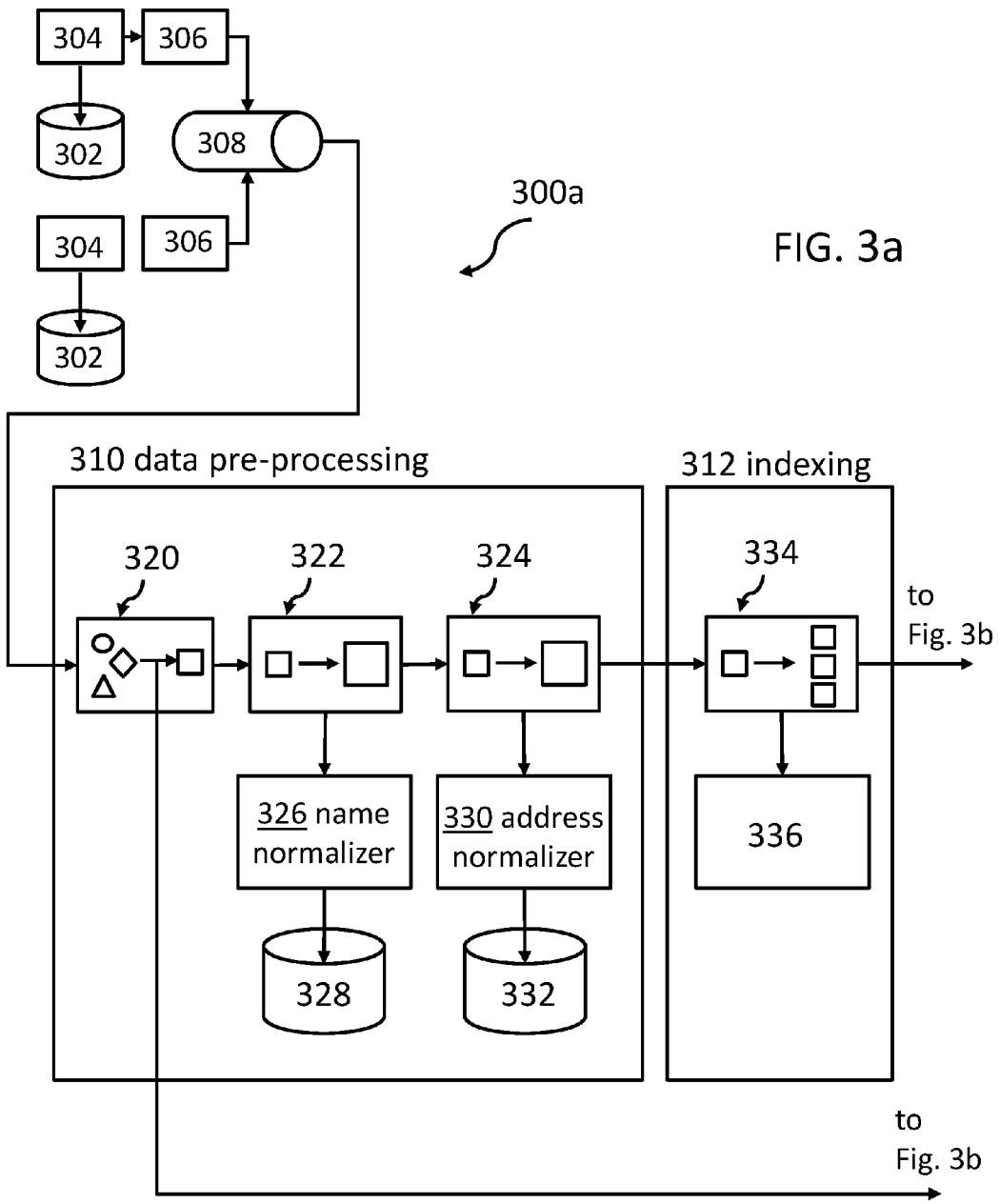
Figure 3B:
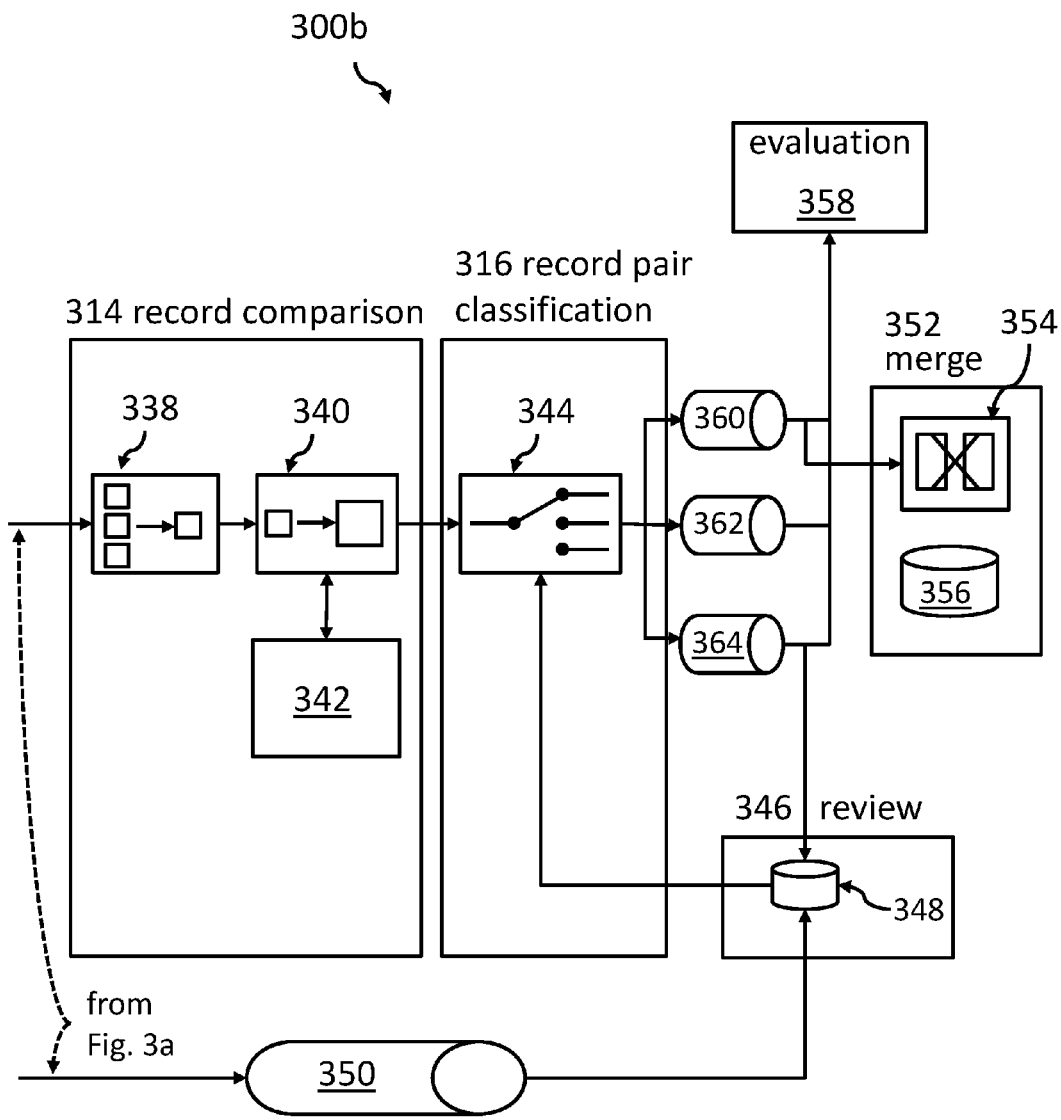

FIG. 3a and FIG. 3b show diagrams of an architecture of the proposed solution in accordance with certain embodiments.

FIG. 4 shows sample RDF file in accordance with certain embodiments.

Figure 5:
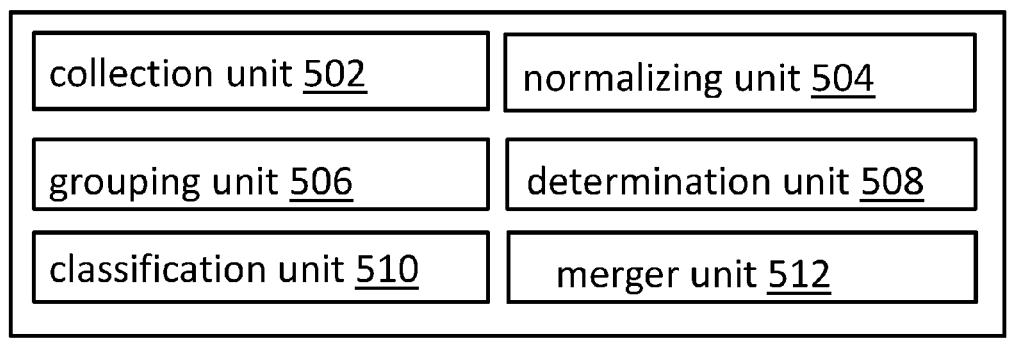
Figure 6:
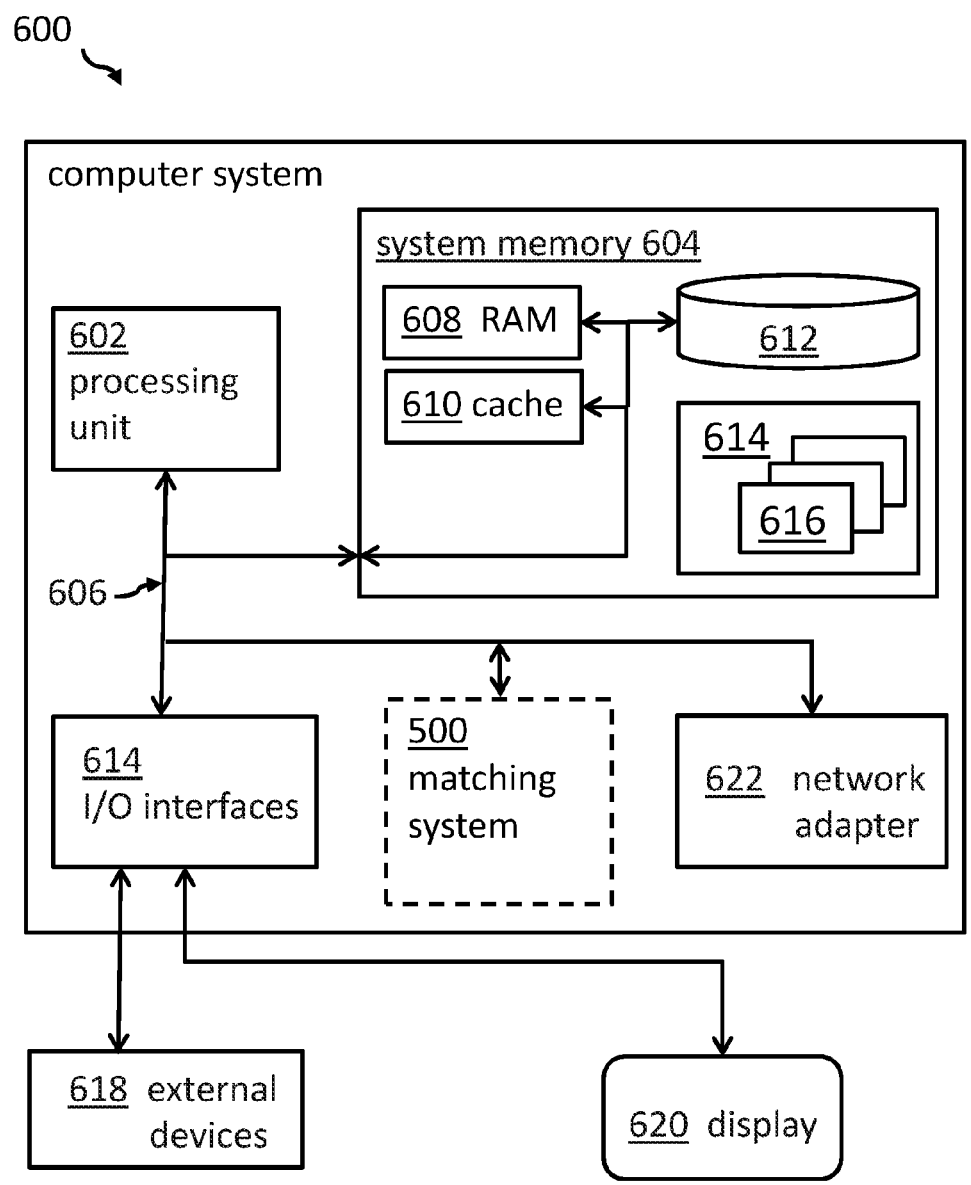

FIG. 5 shows a block diagram of modules of a system for matching different user representations of a person in accordance with certain embodiments FIG. 6 shows a computing system comprising the system for matching different user representations of a person in accordance with certain embodiments.

DETAILED DESCRIPTION

In the context of this description, the following conventions, terms and/or expressions may be used:

The term 'user representation' may denote a user identifier (user ID), an access code or something similar with which a user, i.e., a person or custodian, may access a computer system, an application system or simply data stored as part of an application or on a computer system in any form. Typically, a user may need in addition to his user ID a password for accessing a system. The user representation may be the user ID only or a combination of a user ID and a password.

The term 'information set' may denote a data set like a file in a file system or a record in a file or a database which may have an internal structure for storing different organized sets of data. The information set may be stored as a data structure, e.g., an XML document or a record of a relational or alternatively organized database management system (DBMS). Also a series of linked records in a DBMS is possible. The data in a data set may be a user representation including a series of attributes.

The term 'non-phonetic algorithm' may denote an algorithm that may not use a sound or pronunciation of a word or expression in order to recognize the word or expression. Instead, other mechanisms are used to recognize the word or expression and differentiate it from other words or expressions.

The term 'similarity score' may denote a numeric data value related to a similarity between two expressions. For example, a higher value may relate to a higher similarity between two expressions, whereas a lower value may relate to a lower similarity between two expressions. A specific algorithm may be used to determine a similarity score.

The term 'q-gram' may denote a contiguous sequence of n items from a given sequence of text or speech. It is known in the fields of computational linguistics and probability. The items may be phonemes, syllables, letters, words or base pairs according to the application. The n-grams typically are collected from a text or speech corpus. When the items are words, n-grams may also be called shingles. Monograms, bigrams, and trigrams may be examples of a q-gram.

Q-gram algorithms here refer to algorithms determining similarity between strings based on their q-grams. According to The Code Project—a development resource (e.g., codeproject.com)—q-gram algorithms aren't strictly phonetic matching in that they do not operate based on a comparison of the phonetic characteristics of words. Instead, q-grams may be thought to compute the "distance," or amount of difference between two words. Utilizing the n-gram or q-gram algorithm technique may be highly favorable, as it may match misspelled or mutated words, even if they may be determined to be "phonetically disparate."

For example, the word 'Nelson' has the following q-grams (bigrams): Ne el ls so on. To compare the difference in matching, the word 'Neilsen' is broken down into this q-gram: Ne ei il ls se en. Because the words do sound similar (even though they were spelled differently), they are identified as a match.

The term 'suffix algorithm' may denote an algorithm based on a suffix tree—also known as called PAT tree or, in an earlier form, position tree—may be a compressed trie—also called digital tree and sometimes radix tree or prefix tree—comprising all the suffixes of the given text as their keys and positions in the text as their values. Suffix trees may allow particularly fast implementations of many string operations.

The term 'longest common sub-string algorithm' may denote a technique for finding the longest string (or strings) that is a sub-string (or are sub-strings) of two or more strings.

The term 'Overlap coefficient' or, Szymkiewicz-Simpson coefficient may denote a similarity measure related to the Jaccard index that measures the overlap between two data sets, and is defined as the size of the intersection divided by the smaller size of the two sets:

$$\text{overlap}(X, Y) = \frac{|X \cap Y|}{\min(|X|, |Y|)}$$

If set X may be a subset of Y or the converse then the overlap coefficient is equal to one.

The term 'a Jaccard coefficient', also known as the Jaccard similarity coefficient (originally coined coefficient de communauté by Paul Jaccard) may denote a statistic used for comparing the similarity and diversity of sample sets. The Jaccard coefficient measures similarity between finite sample sets, and is defined as the size of the intersection divided by the size of the union of the sample sets:

$$J(A, B) = \frac{|A \cap B|}{|A \cup B|}.$$

If A and B are both empty, one may define $J(A,B)=1$. Clearly, $0 \leq J(A,B) \leq 1$.

The term 'Dice coefficient', also known as Sorensen-Dice-coefficient, may denote a similar coefficient as the Jaccard coefficient. However, since it doesn't satisfy the triangle inequality, it may be considered a semimetric version of the Jaccard index. The function ranges between 0 and 1, like Jaccard. Unlike Jaccard, the corresponding difference function $$d = 1 - \frac{2|X \cap Y|}{|X| + |Y|}$$

is not a proper distance metric as it does not possess the property of triangle inequality. The simplest counterexample of this is given by the three sets {a}, {b}, and {a,b}, the distance between the first two being 1, and the difference between the third and each of the others being one-third. To satisfy the triangle inequality, the sum of any two of these three sides must be greater than or equal to the remaining side. However, the distance between {a} and {a,b} plus the distance between {b} and {a,b} equals ⅔ and is therefore less than the distance between {a} and {b} which is 1.

Embodiments for matching different user representations of a person may offer some advantages.

The Embodiments overcome the limitation of existing solutions to identify custodians, namely: address matching techniques may not be sufficient or not applicable to system IDs; they may often look for properties such as street addresses and birth dates to determine matches between multiple entities. Existing systems may also not be appropriate and tailored to a matching of person representations as in "computer users". Additionally, simple, naive matching techniques may be too expensive because they cannot compare all possible combinations in a brute-force attempt. Moreover, listing of all possible matching user accounts for a manual selection may not be feasible in a useful time interval.

Embodiments may also allow reducing the risk in legal disputes, which may include discovery procedure because a user of a related governance system may gain insight into which systems each employee, i.e., custodian may have access to and what artifacts he or she may own or may have accessed or modified or can read. This is particularly important for legal hold orders in which artifacts that a particular person has or had access to, had authored or modified may not be deleted for the course of a legal dispute and hence need to be identified. Without a solution that identifies clearly the particular person, one may often see that too many artifacts are retained, which leads to exorbitant cost and also legal risk if such artifacts are later included in the legal case even though they were not responsive, e.g., the owner had a similar name as a custodian of the legal case, but was not the same person.

Existing solutions aim primarily at data matching of master data, i.e., structured information about customers of one or more organizations. Therefore, they pay a lot of attention to names, addresses, dates of birth and other personal information. Embodiments, however, concentrate primarily on the employees and custodians rather than customers of an organization. Unlike customer databases, user management systems do not provide such a rich set of information like addresses and dates of birth, and, therefore, the matching technique may concentrate on a different set of metadata. In particular, an important attribute for matching employees and custodians electronic representations may be a user name. As a result, the matching technique of embodiments employs a special handling and assigns the highest weight to similarities discovered within account names of regular employees and custodians.

In a nutshell, the following may be addressed successfully by the technical nature and features of the embodiments: (a) Organizations may minimize costs and risks associated with electronic data processing by identifying the legal name of owners of that data, and who had or has access to that data. (b) Sources of person representations may be disparate due to a wide range of system implementations, various abstraction levels, historic reasons and system limitations. (c) Disparate data sources may store person representations in heterogeneous formats. A manual process would take far too long and may thus not be feasible.

According to an embodiment, the non-phonetic algorithm may be one out of the group comprising a q-gram algorithm and a suffix algorithm. Other non-phonetic algorithms may also be applied. However, the named ones may be implemented easily and computational-wise comparably cheap.

According to one optional embodiment, the similarity score may be determined or calculated by first using a longest common sub-string algorithm followed by using an output of the longest common sub-string algorithm for one out of the group comprising an Overlap coefficient, a Jaccard coefficient and, a Dice coefficient. These algorithms are known for their efficiency. Exemplary implantations may easily be adapted in the context of the embodiments.

According to an embodiment, a longest common sub-string as a result of the longest common sub-string algorithm may be determined using dynamic programming algorithms. Such dynamic programming algorithms may be faster if compared to conventional programming algorithms. For example, a string comparison may be much faster if implemented using dynamic programming algorithms. In dynamic programming, a technique for solving a complex problem may be solved by breaking it down into a collection of simpler sub-problems. It is applicable to problems exhibiting the properties of overlapping sub-problems and optimal substructure. In order to solve a given problem, using a dynamic programming approach, one need to solve different parts of the problem (sub-problems), and then combine the solutions of the sub-problems to reach an overall solution. Often when using a more naive technique, many of the sub-problems are generated and solved many times. The dynamic programming approach seeks to solve each sub-problem only once, thus, reducing the number of iterations: once the solution to a given sub-problem has been computed, it is stored or "memorized": the next time the same solution is needed, it is simply looked up. This approach is especially useful when the number of repeating sub-problems grows exponentially as a function of the size of the input.

According to one additional embodiment, the similarity score may be determined based on similarity scores calculated for all corresponding attributes of two information sets. Each information set may be a combination of attributes in, e.g., a record of information or another regular data structure. Determining similarity scores between all attributes of two information sets matching data sets may be identified.

According to a permissive embodiment, weights may be used for the attributes when calculating the similarity scores for all attributes. This way, it may be possible to emphasize some attributes more than others, e.g., based on its location within the data set. Other weighting techniques may be possible.

According to an embodiment, the set of classes comprise also potential matches. This class may be used beside the class "match" and the class "non-matches" for that case in which a predefined threshold may not be overcome in determining differences or similarities between information sets. The embodiment may not determine for sure that two information sets may identify the same custodian. In such a case, information sets may be marked as "undecided" or potential matches.

According to one optional embodiment, a decision value, in particular an input value from a user may be received, e.g., by a user interface from a user, for a classification of the information sets in the class of potential matches. In case the embodiment may not be able to determine an unambiguous assignment to one of the two main classes "match" or "non-match", a user may be given a chance to decide after the potential matches may have been displayed to that user.

According to a further embodiment, a combination of a FOAF ontology, i.e., Friend-of-a-Friend ontology, a Resource Description Format (RDF) and a Web Ontology Language (OWL) may be used for merging the information set pairs classified as matches. A combination of the mentioned techniques may guarantee that a user may recognize the matching information sets by one single custodians quickly and easily.

In the following, a detailed description of the figures will be given. All instructions in the figures are schematic. Firstly, a block diagram of an embodiment of the inventive computer-implemented method for matching different user representations of a person is given. Afterwards, further embodiments as well as embodiments of the system for matching different user representations of a person will be described.

FIG. 1 shows a block diagram 100 of operations for matching different user representations of a person in accordance with certain embodiments. The person may be a custodian, i.e., one single and unique person, who is responsible for a data access. The user representations may be stored in a plurality of computer systems. However, it may also concern different applications on one computer system or data in a storage system related to one or more computer systems. Embodiments comprise collecting, 102, information sets about user representations from a plurality of computer systems. In certain embodiments, the user representations may be used in different virtual machines on one computer. The user representations may also originate from different applications, such as a human resource system, a single sign-on system, a retirement fund system, an email application, a social network tool, a content management application, etc. The user pre-presentations may be sent actively from these application to the computer-implemented system for matching different user representations of a person or, the different user representations may be copied from a plurality of databases dedicated to any of the above-mentioned applications or, they may be accessed via a messaging gateway, a messaging bus or, another application programming interface.

Embodiments may comprise normalizing, 104, the information sets to a unified format. This operation may be part of a data-pre-processing stage. Here, attributes or attribute values of the incoming information about the users may be added, deleted or reorganized and may be converted to a common format. E.g., multi-valued attributes may be split into different separate attributes and attribute values.

In a grouping or indexing operation 106, the now normalized information sets may be grouped into indexing buckets based on a user name using a non-phonetic algorithm as discussed above, e.g., such as a q-gram or a suffix-array algorithms.

Additionally, embodiments may also comprise determining, 108, a similarity score for each pair of information sets or records in each of the indexing buckets. It may be understood that complete records may be compared in this operation. The determining or calculation may be based on using a longest common sub-string algorithm followed by using an output of the longest common sub-string algorithm for one out of the group comprising an Overlap coefficient, a Jaccard coefficient and, a Dice coefficient. Thus, record compare may deliver one similarity score value in form of a number. Each set of pair with its similarity score may be managed as a separate new object and may thus enrich the data set.

Next, embodiments may comprise classifying, 110, each information set pair—or each new object—into a set of classes based on the similarity scores, wherein the set of classes comprise at least matches and non-matches. This may be achieved by a threshold model. Object with a similarity score value above or equal a predefined threshold value me go into the "matches class", wherein the remaining objects may go into the "non-matches class".

Then, embodiments may comprise using, 112, a data structure, in particular an electronic structured document having a pre-defined format, for merging information of information set pairs classified as matches. Additionally, this/these structured document/s may be displayed to a user for further processing, e.g., a clerical review.

FIG. 2 shows a block diagram 200 of main components of a related system in accordance with certain embodiments. Data about user representations may be read from one or more storage systems or source data from data sources 202. The matching system 204 for matching different user representations of a person in a plurality of computer systems may integrate the different user representations and present a merged representation of a custodian, 206. These information sets about identified custodians may then be further processed in a system 208 for data governance or information integration.

In short, the matching system 204 may receive possibly non-normalized sets of user representations in various format, encoding, or both as an input and performs a classification task by discovering matches, non-matches and, optionally, possible matches. Once the matching process is complete, its results are fused into a unified format, which is referred to as a merged representation of a person. The fused representation may be further used by other systems, such as data governance, information integration, or other systems to analyze which system a user has access to, which is useful in electronic discovery scenarios (e.g., putting an employee or custodian on hold), de-provisioning scenarios (e.g., retaining information of an employee who has exited an organization), etc.

FIG. 3a, b show a block diagram 300a, and a block diagram 300b of more detailed architecture diagrams of the system 204 (in FIG. 2) for matching user representations which may represent one example of the core of the proposed solution 204 illustrated on a general level in FIG. 2 in accordance with certain embodiments. It may be noted that block diagram 300a and block diagram 300b may be seen as one single joint architecture diagram. Only for size matters it is separated. Data sources 302 may be all kinds of media, where user accounts, i.e., user representations may reside and used by different applications 304: file shares (e.g., Common Internet File System (CIFS), Network File System (NFS), etc.), email servers (e.g., Microsoft® Exchange server, IBM® Domino® server, etc.), directory services (e.g., Active Directory ® service, Tivoli® Directory Service, Network Information Service, etc.), collaborations servers (e.g., Microsoft® SharePoint® server), policy management systems (e.g., IBM® Atlas Policy Suite system), and Human Resource (HR) databases as well as others. (Microsoft, Active Directory, and Sharepoint are registered trademarks or common law marks of Microsoft Corporation in the United States and/or other countries.) (IBM, Domino, and Tivoli are registered trademarks or common law marks of International Business Machines Corporation in the United States and/or other countries.)

It may be noted that block 204 of FIG. 2 may here, in FIGS. 3a, 3b, at least be split into the functions data pre-processing 310, indexing/grouping 312, record comparison 314 and, record pair classification 316 and, evaluation module 358.

In more detail: The applications 304 may deliver the data, i.e., user representations via a messaging gateway 306 and a messaging bus 308 to the matching system 204. This may be built in a modular way: The matching system 204 takes the user representations through data pre-processing 310, indexing 312, comparison 314, record pair classification 316 and, when a match was found, merge operations 354. All these operations may be independent, and may be implemented as sub-components of the matching system 204.

Data-pre-processing 310: In the data preprocessing stage, a message or other piece of information containing a user representation first goes through a normalizer 320. The purpose of the normalizer is to add, delete, or reorganize, attributes of the incoming message and convert it to a common format. A content-based router analyzes contents of one or more attributes of a message and makes a decision where to forward it forward. The normalizer may use an identifier or a type of a data source to get a deeper insight about the attributes of a message. When the type of a data source or an incoming message format is identified, the message goes to one of the translators which knows how to convert a specific type to a common format.

As some attributes of a message may contain more than one piece of information, such as an address or a full name, normalizers should pass possibly multi-valued attributes through a tokenizer that splits composite values and add them as separate attributes of a message. This may be achieved by the content enrichers 322, 324, the name and address normalizer 326, 330 as well as a database/lookup table of names 328 and a database with geographical information 332. For example, in one user representation a user name may be represented in one data field, e.g., like, "Arthur Miller". In another user representation of another source system the user name may be represented in two data fields, e.g., first name, surname giving "Arthur" and "Miller". The normalizer may split the one data field representation into a two data field representation for better comparability.

In another example, an address associated with a user representation may only be stored as a street name including a house number and a city name in one string. Again, the address components may be separated into separate data fields (i.e., attributes), e.g., street, house number and, city. Additionally, from a geographical information database a corresponding ZIP code may be added, thus enriching the data.

Other tasks that a normalizer 310 may encompass are:
removing unnecessary attributes,
handling missing values, and
deleting unnecessary graphemes.

Indexing/Grouping 312: A good solution for the grouping step when processing user accounts and other computer system specific user representations may be the use of non-phonetic algorithms, such as q-gram or suffix-array algorithms. These employ block- or bucket-based approaches combined with a user name blocking (aka sorting) key. If a data source does not provide a user name, the described matching system 204 automatically constructs a realistic system or user name based on other attributes provided, such as the full name of a person to facilitate matching with system representations from other data sources 302. That may not provide a full name but instead only a system identifier/user name.

Widely-adopted phonetic algorithms in known technologies, such as Soundex or Phonex for matching person representations in master data as a part of information integration are not useful for data governance scenarios. The reason for this is that often system accounts do not contain information about a full name of a person, but persist a user name instead. Usually, a user name includes some fragments from a full name of a person, but it is generally hard to predict a pattern that stands behind it.

For example, a phonetic algorithm would probably fail to put user names 'johnsmith', 'smithjohn', and 'jsmith' into one indexing bucket, while the q-gram or suffix-array based approaches used in the embodiments described in this disclosure are able to recognize similarities in these user names. The indexing 312 may use a splitter 334 to sort the user representations into the above-mentioned buckets based on the results of the also above-mentioned non-phonetic algorithms. Block 336 may represent the grouped user representations in the indexing buckets and may thus be an equivalent for indexing bucket assignments.

Record Comparison 314 (FIG. 3*b*): After an indexing bucket 336 has collected enough elements, where the term 'enough' means at least two, the matching system 204 may initiate the record comparison step 314, wherein a respective similarity score for each pair of user representations in an indexing bucket 336 may be determined. With embodiments, each two information set pairs may be compared to each other using one of the already-mentioned techniques of string comparison. Thus, the comparison is not only made attribute by attribute, but record by record including all attributes. However, in order to emphasize the importance of one or more individual attributes, weights may be used for certain attributes. At the end of such a record comparison 314, an individual number for a record comparison 314 may be the result. An identifier of each involved record or the related records itself and the similarity score value may together be treated as a new object in the data set, i.e., the indexing bucket. This generating of these new objects may be interpreted at data enrichment 340 because the indexing bucket information has been enriched by the similarity score and the relationship of the related user representations.

In other words, one goal to be achieved by the record comparison step is to measure how similar any two given records are. For this purpose, a similarity function performing the similarity score calculation 342 is defined as part of embodiments. It calculates a similarity score between user representations. According to the embodiments, one may achieve good results using a longest common sub-string algorithm using Overlap, Jaccard, or Dice coefficients. Another improvement of processing performance and efficiency may be achieved through the application of dynamic programming techniques (e.g., Cormen, Leiserson et al) to this problem that is helpful in reducing the run time of this algorithm from n*2 to n*log n, wherein n is the number of all user representations.

Before performing the similarity score using the similarity score calculation 342, the user representation pairs may be aggregated 338, meaning that all potential pairs may be defined and related to each other. In this sense, the similarity scoring calculation 342, wherein each pair of user representations in an indexing bucket is provided with a similarity score, may be seen as the content enrichment process.

With a similarity score for all attributes in two records (=two user representations), it may now be possible to calculate a similarity score between two records. The problem is that some attributes, such as first name, surname, and user name, are more important and unique as, for example, a name of a system where the user representation resides. Therefore, a simple summation of all attributes may give a too high similarity score to an obvious non-match, and under-estimate a highly probable match.

As a solution to this sub-problem, embodiments may employ a weighing algorithm that assigns each attribute a weight and multiplies it with the sub-similarity score of corresponding attributes before the calculation of the (overall) similarity score between two records (collection of attributes). If weights are applied, the similarity scoring 342 may use them in determining the similarity score values by multiplying the sub-similarity scores with the related weighing factor before calculating the (overall) similarity score for the complete records, i.e., the value representing the similarity of two user representations.

Record Pair Classification 316: Based on the similarity score values provided by the unit 342, a record pair classification module or message router 344 decides if a pair of records results in a match, a non-match, or a potential match. A match message bus 360, a potential match message bus 362 and, a non-match message bus 364 may be used for pipelining the results.

Clerical Review 344: Clerical review performed by a user is proposed as a straightforward step in the matching process. Its goal is to determine whether a potential match should be considered as a match or not, and for this reason a real human may be required to make a decision. The system of embodiments would receive a decision value or input value via a user interface.

The clerical review step 346 has some consideration that may help to improve the whole matching process. First, it is quite reasonable to give a reviewer a possibility to manually correct pairs of records if there is an obviously erroneously piece of information in them. Second, it is also quite possible that even a reviewer is not able to tell if two records may match to each other or not. In this case, it would be a good idea to give him or her a way to report the doubt to the matching system 204. In a related message store 348 also those user representations may be stored that have been reported by the normalizer 320 as inappropriate for the matching system via an invalid message channel 350.

Merge of Matches 352: Now that the matching process is almost complete, the next step may be to find a solution of how to merge found person representations. Using a structured document for merging and persisting person representations along with their matches has many advantages over other approaches in general and databases in particular. A combination of such technologies as Friend of a Friend (FOAF) format, the Resource Description Framework (RDF), and Web Ontology Language (OWL) allows not only to have a rich collection of definitions for person representations, but to link one representation to another as, for example, with an owl: sameAs element. A document in such format can be easily parsed by other systems, including data governance and information integration solutions. A message translator 354 in combination with a person DB triple store 356 may be helpful for this process step.

An additional evaluation module 358 may be instrumental for a management of a calculation precision, the accuracy of the algorithms, a recall, an f-measure, specifity, a false positive rate, etc.

An exemplary result of the complete process may look like the following: A prototype implementation in Java® code uses a messaging middleware and a triple store as database storage. (Java is a registered trademark of Oracle Corporation in the United States and/or other countries.) The intermediate result of the execution of the program can be seen in Table 1:

TABLE 1

| Name | Value |
|---|---|
| BlockingKey_1 | abbott |
| BlockingKey_2 | abbott |
| ID_1 | ID1 |
| ID_2 | ID1 |
| JMSDeliveryMo1:Ie | 2 |
| JMSDestination | queue:f/fMatchQueue |
| JMSTimestamp | 1394?2424?193 |
| LastName_1 | Mrs. Yvonne Abbott |
| LastName_2 | Abbott, Yvonne |
| PairKey | ID:414d5120514d412Ü2D20202020 . . . |
| Re-cordId_1 | ID:414d5120514d41202020Ü2020 . . . |
| Re-cordId_2 | ID:414d5120514d41202D20202020 . . . |
| Similarity åcore | 0.95 |
| UCB_1 | ucb1 |
| UCB_2 | ucb2 |
| mcd.Msd | jms_none |

The program may, for example, produce the following output in RDF format and may store it in the triple store database. A sample RDF file 400 is shown in FIG. 4 in accordance with certain embodiments.

FIG. 5 shows a block diagram of modules of a system 500 for matching different user representations of a person in accordance with certain embodiments. The system 500 for matching different user representations of a person in a plurality of computer systems may comprise a collection unit 502 adapted for collecting information sets about user representations from a plurality of computer systems, a normalizing unit 504 adapted for normalizing the information sets to a unified format, and a grouping unit 506 adapted for grouping the information sets in the unified format into indexing buckets based on a user name using a non-phonetic algorithm.

Additionally, the system 500 for matching different user representations of a person may comprise a determination unit 508 adapted for determining a similarity score for each pair of information sets in each of the indexing buckets, a classification unit 510 adapted for classifying each information set pair into a set of classes based on the similarity scores, wherein the set of classes comprise at least matches and non-matches, and a merger unit 512 adapted for using a data structure for merging information of information set pairs classified as matches.

Embodiments of the invention may be implemented together with virtually any type of computer, regardless of the platform being suitable for storing and/or executing program code. For example, as shown in FIG. 6, a computing system 600 is shown in accordance with certain embodiments. The computing system 600 may be a server in accordance with certain embodiments. The computing system 600 is only one example of a suitable computer system and is not intended to suggest any limitation as to the scope of use or functionality of embodiments of the invention described herein. Regardless, computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 600 is shown in the form of a general-purpose computing device. The components of computer system/server 600 may include, but are not limited to, one or more processors (or processing units) 602, a system memory 604, and a bus 606 that couples various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 600 typically includes a variety of computer system readable media. Such media may be any available media that is accessible by computer system/server 600, and it includes both, volatile and non-volatile media, removable and non-removable media.

The system memory 604 (a type of storage) may include computer system readable media in the form of volatile memory, such as random access memory (RAM) 608 and/or cache memory 610. Computer system/server 600 may further include other removable/non-removable, volatile/non-volatile computer system storage media. By way of example only, storage system 612 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, system memory 604 may include at least one program product having a set (e.g., at least one) of program modules that are configured to carry out the functions of embodiments of the invention.

Program/utility 614, having a set (at least one) of program modules 616, may be stored in system memory 604 by way of example, and not limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments of the invention as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, a system 500 for matching different user representations of a person may be connected to the bus system 606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or another devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another device to cause a series of operational steps to be performed on the computer, other programmable apparatus or other device to produce a computer implemented process, such that the instructions which execute on the computer, other programmable apparatus, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is further noted that the medium having computer readable program instructions thereon may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or steps plus function elements in the claims below are intended to include any structure, material, or act for performing the function in combination with other claimed elements, as specifically claimed.

The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for matching different user representations of a person in a plurality of computer systems, the method comprising:
grouping information sets into indexing buckets with user names as sort keys using a non-phonetic algorithm, wherein the non-phonetic algorithm does not use any of a sound and a pronunciation of the information sets in order to recognize the information sets, wherein the user names are used to access different applications on a plurality of computer systems;
determining a total similarity score by determining:
a similarity score for each pair of corresponding attributes of each pair of information sets in each of the indexing buckets, and
a similarity score for each pair of information sets in each of the indexing buckets by:
using a longest common sub-string algorithm to generate an output; and
using any of an Overlap coefficient and a Dice coefficient on the output of the longest common sub-string algorithm;
merging information of each pair of information sets classified as matches based on each total similarity score; and using the merged information to identify a user and access to data by that user for performing a hold on the data.

2. The computer-implemented method according to claim 1, wherein the non-phonetic algorithm is any one of a q-gram algorithm and a suffix algorithm.

3. The computer-implemented method according to claim 1, wherein a longest common sub-string is determined using dynamic programming algorithms.

4. The computer-implemented method according to claim 1, wherein weights are used when calculating the similarity scores for the corresponding attributes.

5. The computer-implemented method according to claim 1, further comprising:
   classifying each pair of information sets based on each total similarity score as any of matches, non-matches, and potential matches.

6. The computer-implemented method according to claim 5, further comprising:
   determining whether each of the potential matches is to be classified as a match.

7. The computer-implemented method according to claim 1, wherein a combination of a Friend-of-a-Friend ontology, a Resource Description Format and a Web Ontology Language is used for merging each pair of information sets classified as matches.

* * * * *